United States Patent
Yamada (10) Patent No.: US 7,146,534 B2
(45) Date of Patent: Dec. 5, 2006

(54) IMAGE PROCESSING APPARATUS AND METHOD FOR CONTROLLING THE SAME

(75) Inventor: Tomoko Yamada, Kanagawa (JP)

(73) Assignee: Fuji Photo Film Co. Ltd., Kanagawa (JP)

( * ) Notice: Subject to any disclaimer, the term of this patent is extended or adjusted under 35 U.S.C. 154(b) by 1000 days.

(21) Appl. No.: 09/986,377

(22) Filed: Nov. 8, 2001

(65) Prior Publication Data

US 2002/0054281 A1    May 9, 2002

(30) Foreign Application Priority Data

Nov. 8, 2000   (JP)   ............... 2000-340351

(51) Int. Cl.
  *G06F 11/00*   (2006.01)
(52) U.S. Cl. .................. 714/23; 714/11; 714/36; 713/1; 713/2
(58) Field of Classification Search .............. None
   See application file for complete search history.

(56) References Cited

U.S. PATENT DOCUMENTS 5,461,705 A * 10/1995 Wakabayashi et al. ..... 358/1.16
6,513,113 B1 * 1/2003 Kobayashi ................. 713/2
6,671,069 B1 * 12/2003 Kurosawa et al. .......... 358/1.9
2003/0009656 A1 * 1/2003 Yamamura ................ 713/1

* cited by examiner

Primary Examiner—Robert Beausoliel
Assistant Examiner—Yolanda L. Wilson
(74) Attorney, Agent, or Firm—Birch, Stewart, Kolasch & Birch, LLP

(57) ABSTRACT

When an instruction for emergency stop of an image processing system due to an abnormal state of the image processing system is given, a main process of the image processing system gives, to all of subprocesses and image processing-related equipment which are managed thereby, an instruction for stopping processing which is being executed and forcedly making transition to an initial state, that is, a state at the time of starting (at the time of generating a process). When a normal response to the instruction is received from each of processes and equipment within a specified time, it is determined that the abnormal state of the image processing system has been eliminated and the image processing system has been restored, and a notice that emergency stop and reset (transition to an initial state) of the image processing system (and the image processing-related equipment) has been completed, is given to an operator.

20 Claims, 8 Drawing Sheets

IMAGE PROCESSING APPARATUS AND METHOD FOR CONTROLLING THE SAME

BACKGROUND OF THE INVENTION

1. Field of the Invention

The present invention relates to an image processing apparatus and a method for controlling the same, and particularly to an image processing apparatus provided with image processing section which performs image processing after system initialization processing for image processing has been carried out at the time of turning on a power source or during start-up, and a control method applied to the image processing apparatus.

2. Description of the Related Art

Conventionally, a digital laboratory system has been known, wherein various types of image processing is carried out by an image processing section for image data obtained by reading an image recorded on a photographic film using a film scanner, or image data obtained by photographing a subject using a digital still camera, and based on the image data subjected to the image processing, image output processing such as recording of an image on a recording material, or writing thereof in an image recording medium such as CD-R is carried out. As compared with a conventional photographic processing system in which a film image is recorded on a photographic printing paper by analog exposure, the digital laboratory system as described above has the merit of being capable of freely controlling an image quality of a recorded image by various types of image processing carried out in the image processing section.

The above-described image processing section of the digital laboratory system is provided with an image processing base plate on which various types of image processing is carried out for image data. The image processing section is structured so as to include a computer in which an image processing program for carrying out calculation of processing conditions for image processing or image processing equivalent to that of the image processing base plate is installed, and also include a display on which an image is shown. The image processing for image data is carried out in such a manner as described below.

That is, in the image processing section, each time image data is inputted to the image processing section from image data input equipment such as a film scanner, the computer of the image processing section, first, executes an image processing program to thereby carry out analysis of image data, calculation of processing conditions for image processing based on the result of analysis, and image processing corresponding to the calculated processing conditions in a sequential manner. Image data subjected to image processing by the computer is indicated, as an image, on a display, and is used for testing of processing conditions for image processing by an operator. In the image processing section, when the processing conditions are determined, the computer executes the image processing program to thereby allow control so that image processing corresponding to the determined processing conditions is carried out for identical image data by the image processing base plate. The image data subjected to image processing by the image processing base plate is used for image output processing by image output equipment such as a printer.

As described above, in the image processing section of the digital laboratory system, the computer and the image processing base plate effect image processing in cooperation with each other, and it is necessary that, depending on a system configuration, each operation of the image data input equipment such as a film scanner, and the image output equipment such as a printer be controlled and these equipment be actuated synchronously. Accordingly, when the power source of the image processing section is turned on, the image processing section also needs to carry out, in addition to processing to be executed by a general computer at the time of start-up, initialization of the image processing base plate (down load of a parameter or a program), initialization of external equipment, establishment of a state in which the computer is capable of communicating with external equipment, and the like. Therefore, a lot of time is required for build-up of the image processing section (until the image processing section is brought into a state of being capable of performing image processing after the power source thereof is turned on).

Further, there is a possibility that during image processing after build-up, the image processing section may be brought into an inoperative state due to, for example, inconsistency of the state between units, abnormality of a communication system, or the like. In order that the image processing section be restored from the inoperative state, the image processing section has a forced shut-down function by which it is forcedly shut down by itself and thereafter restarted. When an operator detects a state in which the image processing section is brought into an inoperative state, the forced shutdown function is operated. In this case as well, the same processing as that at the time of turning on the power source is carried out, and a lot of time (for example, approximately 10 to 15 minutes) is required for restoration of operation.

Although the image processing section is not frequently brought into an inoperative state, once the image processing section is brought into an inoperative state, image processing under execution needs to be interrupted for a long period of time, which in turn exerts a very great influence on man power of an operator. Accordingly, reduction of restoration time when the image processing section is brought into an inoperative state is strongly demanded.

SUMMARY OF THE INVENTION

The present invention has been achieved in view of the above-described circumstances, and an object thereof is to provide an image processing apparatus in which an average restoration time when an abnormal state such as an inoperative state is caused can be shortened, and a method for controlling the same.

In order to achieve the above-described object, a first aspect of the present invention is an image processing apparatus comprising: an image processing section which performs system initialization processing for image processing when a power source is turned on or at a starting, and performs image processing in accordance with an instruction for execution of image processing; an abnormal state (bad condition) detecting section for detecting generation of an abnormal state of the image processing section; and a trial section which, when the abnormal state of the image processing section is detected by the abnormal state detecting section, makes a trial of eliminating the abnormal state by controlling so that at least the image processing section transits to an initial state without performing the system initialization processing.

A second aspect of the present invention is an image processing according to the first aspect, wherein the system initialization processing by the image processing section includes at least one of an operation of turning on again a power source of the image processing section, and an operation of down loading a parameter or a program to an image processing substrate, which is mounted in the image processing apparatus and is a part of the image processing section.

A third aspect of the present invention is an image processing according to the first aspect, further comprising an equipment related to the image processing, wherein the system initialization processing performed by the image processing section includes at least one of an operation of turning on again a power source of the equipment related to the image processing and initializing the equipment related to the image processing, and an operation of down loading a parameter or a program to the equipment related to the image processing.

A fourth aspect of the present invention is an image processing according to the first aspect, wherein the abnormal state detecting section is provided so as to detect the abnormal state of the image processing section based on a determination as to whether a restart button for indicating restart of the image processing section has been turned on.

A fifth aspect of the present invention is an image processing according to the first aspect, wherein the image processing section comprises a single main process and plural sub-processes, and the trial section allows transition of the image processing section to an initial state by giving, to the plural subprocesses of the image processing section, an instruction for transition to an initial state.

A sixth aspect of the present invention is an image processing according to the first aspect, further comprising an equipment related to the image processing, wherein the trial section allows transition of the equipment related to the image processing, to an initial state by giving, to the equipment related to the image processing, an instruction for transition to an initial state.

A seventh aspect of the present invention is an image processing according to the fifth or sixth aspect, wherein the trial section makes a determination that, based on a determination as to whether a normal response with respect to the instruction for transition to an initial state has been received from all subjects for the instruction within a predetermined time, transition to an initial state has succeeded or failed.

An eighth aspect of the present invention is an image processing according to the first aspect, further comprising a notification section for giving a notice that the transition to an initial state by the trial section has succeeded or failed.

A ninth aspect of the present invention is an image processing according to the first aspect, further comprising a start control section which, when the transition to an initial state by the trial section has failed, controls the image processing section so that the image processing section is restarted and performs allow the system initialization processing.

The image processing apparatus according to the first aspect of the present invention includes the image processing section which performs system initialization processing for image processing when a power source is turned on or when starting up, and performs image processing in accordance with an instruction for execution of image processing. According to the second aspect of the present invention, the system initialization processing performed by the image processing section can include at least one of an operation of turning on again a power source of the image processing section (or the entire image processing apparatus), and an operation of down loading a parameter or a program to an image processing base plate (image processing substrate), which is mounted in the image processing apparatus and forms a part of the image processing section.

Further, when the image processing apparatus is provided with equipment related to image processing (for example, image input equipment such as a film scanner, and image output equipment such as a printer), according to a third aspect of the present invention, the system initialization processing performed by the image processing section can include at least one of an operation of turning on again a power source of the equipment related to the image processing and initializing the equipment, and an operation of down loading a parameter or a program to the equipment related to the image processing.

The above-described operation of turning on again the power source, initialization, and down loading of a parameter or a program require a lot of time. Therefore, there is a drawback in that, when the system initialization processing is performed due to an abnormal state (an inoperative state) of the image processing section, long time is required until the image processing section is restored (brought into an operable state). On the other hand, the present inventors have found that there are several kinds of states in which an abnormal state occurs in the image processing section, and some of the states can be restored without performing the system initialization processing.

In the first aspect of the present invention, the trial section is provided which, when the abnormal state of the image processing section is detected by the abnormal state detecting section, makes a trial of eliminating the abnormal state by controlling so that at least the image processing section undergoes a transition to an initial state without performing the system initialization processing. As a result, so long as the image processing section in which an abnormal state occurs therein is in a state in which the image processing section can be restored without performing the system initialization processing, the trial section controls so that at least the image processing section transits to the initial state without performing the system initialization processing, thereby allowing restoration of the image processing section in a short time (that is, elimination of the abnormal state). Accordingly, an average restoration time when the abnormal state, for example, an inoperative state occurs in the image processing section can be reduced.

It is possible that a determination is made as to whether the image processing section in which a abnormal state occurs therein, cannot be restored without performing the system initialization processing; when it is determined that the image processing section can be restored without performing the system initialization processing, the image processing section is controlled so as to undergo a transition to the initial state; when it is determined that the image processing section cannot be restored without performing the system initialization processing, the image processing section is restarted so as to allow the system initialization processing. However, processing for determining the state of the image processing section is very complicated and requires a lot of time.

In the first aspect of the present invention, control for allowing transition of at least the image processing section to an initial state without performing the system initialization processing is uniformly (every time) performed without making a determination as to the state of the image processing section Therefore, as compared with a case in which the state of the image processing section is determined each time an abnormal state occurs in the image processing section, the structure of the trial section can be made simple. Even when the trial section is realized by a computer and a program executed by the computer, processes for generation of the program by which the trial section is realized, can be reduced.

Further, the abnormal state detecting section according to the present invention can also be provided so as to detect occurrence of the abnormal state by, for example, monitoring the state of the image processing section. However, in accordance with a fourth aspect of the present invention, the abnormal state detecting section is preferably provided so as to detect the abnormal state of the image processing section based on a determination as to whether a restart button for indicating restart of the image processing section has been turned on. The restart button may be a button provided in a casing body of the image processing apparatus main body or in an information input device such as a keyboard, or may be a button displayed on an displaying section such as a display monitor.

The restart button according to the fourth aspect of the present invention is turned on by an operator who recognizes an abnormal state occurring in the image processing section, and based on the determination as to whether the restart button is turned on, occurrence of an abnormal state in the image processing section is detected. Accordingly, occurrence of the abnormal state in the image processing section can be detected by a simple structure, and occurrence of inconvenience in which a fixed load of the image processing apparatus increases due to continuous monitoring of the state of the image processing section, can also be prevented.

Further, the image processing section according to the present invention can be formed by, for example, a single main process and plural subprocesses (that is, processes started and executed by the main process). In this case, according to the fifth aspect of the present invention, the trial section allows transition of the image processing section to an initial state by giving, to the plural subprocesses of the image processing section, an instruction for transition to an initial state. The above-described system initialization processing is generally performed by the main process. Due to an instruction for transition to an initial state being given only to the subprocesses (not including the main process), transition of the image processing section to the initial state can be easily performed without performing the system initialization processing.

Moreover, when the image processing apparatus is provided with equipment related to image processing (for example, image input equipment such as a film scanner, and image output equipment such as a printer), according to the sixth aspect of the present invention, the trial section allows transition of the equipment related to the image processing, to an initial state by giving, to the equipment related to the image processing, an instruction for transition to an initial state. In this case, when the instruction for transition to an initial state is given to the equipment related to image processing, the equipment related to image processing not including the image processing section is allowed to undergo a transition to the initial state by performing processing which can be completed in a short time, such as cancellation of held image data without performing processing such as an operation of turning on again a power source or down loading of a parameter or a program, which needs a long time for completion of processing.

In the fifth and sixth aspects of the present invention, the determination as to whether transition to an initial state has succeeded or failed can be made based on a determination as to whether a normal response to the instruction for transition to an initial state has been received from all subjects for the instruction (for examples, subprocesses or equipment related to image processing) within a predetermined time. The state of the image processing section in which an abnormal state occurs, which cannot be restored without performing the system initialization processing, results from abnormality in a communication system or the like. For example, when the instruction for transition to an initial state is given in the above-described state, some of the subjects for the instruction is not capable of returning (sending) a normal response to the instruction for transition to an initial state. However, in the seventh aspect of the present invention, a determination as to whether the transition to an initial state has succeeded or failed is made based on a determination as to whether the normal response to the instruction for transition to an initial state is received from all of subjects for the instruction within a predetermined time. Accordingly, the determination as to whether the transition to an initial state has succeeded or failed, can be easily and reliably made.

Further, according to the eighth aspect of the present invention, preferably, a notification section is further provided, which gives a notice that the transition to an initial state by the trial section has succeeded or failed. Notification by using the notification section can be carried out by, for example, displaying a message on an displaying section such as a display monitor or generating a voice. As a result, an operator or the like can easily recognize as to whether control by using the trial section has succeeded (that is, whether a transition to an initial state without performing the system initialization processing is done) and whether restart of the image processing section including the system initialization processing is needed.

When transition to an initial state by the trial section has failed, the image processing section may be restarted by an operator's instruction. However, according to the ninth aspect of the present invention, a start control section is preferably provided which, when the transition to an initial state by the trial section has failed, controls the image processing section so that the image processing section is restarted and performs the system initialization processing. As a result, when an abnormal state such as an inoperative state is caused in the image processing section, the image processing section can reliably be restored without requiring an operator's hand or the like.

According to a tenth aspect of the present invention, there is provided a method for controlling an image processing apparatus including an image processing section which performs system initialization processing for image processing when a power source is turned on or at a starting, and performs image processing in accordance with an instruction for execution of image processing, said method comprising the steps of: when an abnormal state of the image processing section is detected, making a trial of eliminating the abnormal state by controlling so that at least the image processing section transits to an initial state without performing the system initialization processing; and controlling the image processing section so that, when the transition to an initial state has failed, the image processing section is restarted and performs the system initialization processing. Accordingly, in the same manner as in the first aspect of the present invention, an average restoration time when an abnormal state such as an inoperative state is caused, can be reduced. Further, in the same manner as in the ninth aspect of the present invention, the image processing section can be restored without requiring an operator's hand or the like.

DESCRIPTION OF THE PREFERRED EMBODIMENTS

Figure 1:
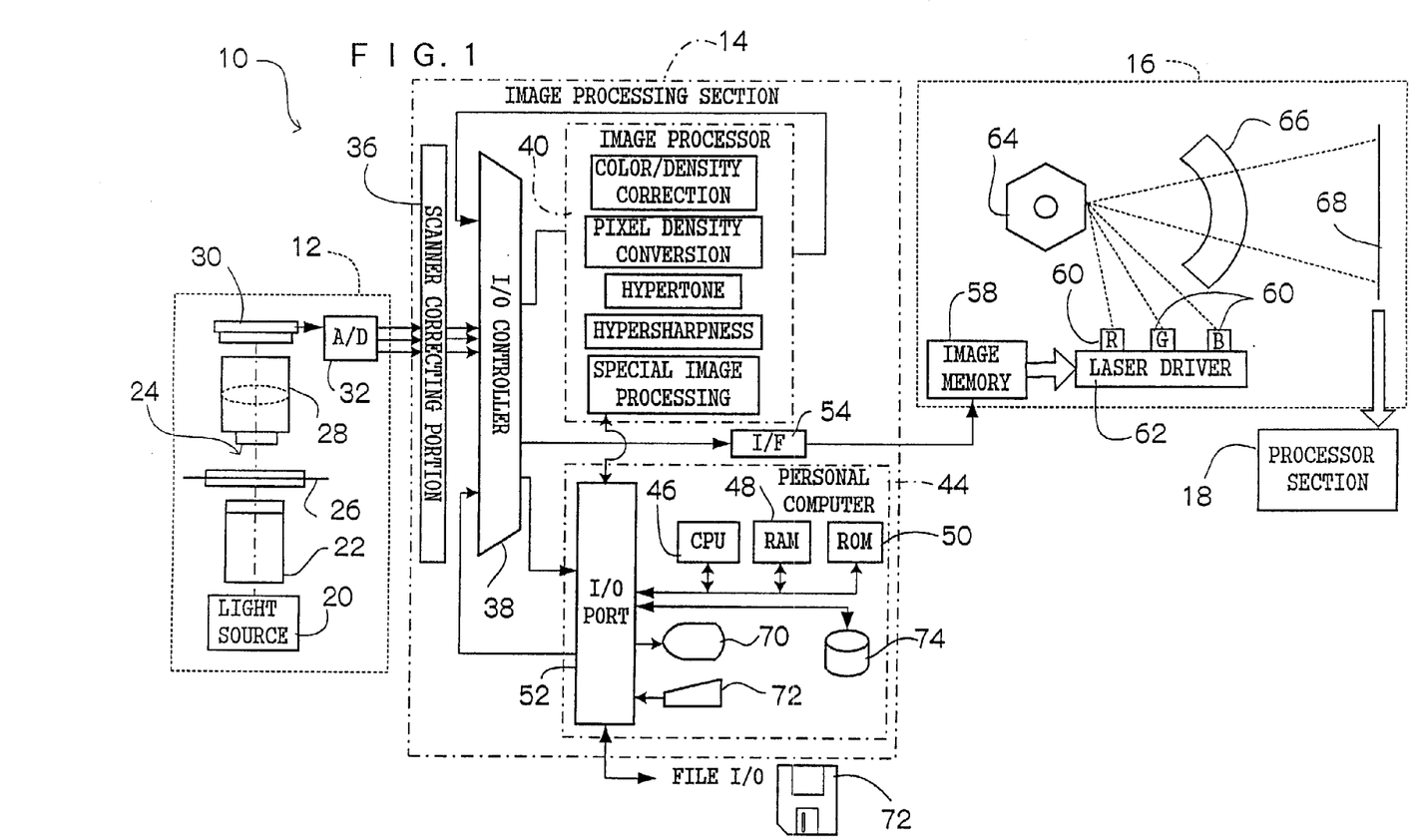
FIG. 1 is a block diagram which schematically shows the structure of a digital laboratory system according to an embodiment of the present invention.

Referring now to the attached drawings, an embodiment of the present invention will be hereinafter described in detail. FIG. 1 shows a digital laboratory system 10 to which the present invention is applied. The digital laboratory system 10 is structured in such a manner that a film scanner 12, an image processing section 14 and a printer 16 are serially connected. The digital laboratory system 10 corresponds to an image processing apparatus of the present invention. The film scanner 12 and the printer 16 correspond to "equipment related to image processing" according to the present invention.

The film scanner 12 is provided so as to read a film image (that is, a negative image or a positive image visualized by development processing after photographing a subject; "film image" corresponds to an original image of the present invention) recorded on a photographic light-sensitive material (hereinafter referred to simply as a photographic film) such as a photographic film 26 (for example, a negative film or a reversal film) and output image data obtained by the reading. Light emitted from a light source 20 and made into a state in which ununiformity in the amount of light is reduced by a light diffusion box 22, is applied to the photographic film 26 set in a film carrier 24, and the light transmitted through the photographic film 26 is made to form an image on a light receiving surface of a CCD sensor 30 (for example, a linear CCD sensor or an area CCD sensor) via a zoom lens 28.

The film carrier 24 conveys the photographic film 26 in such a manner that portions on the photographic film 26 in which film images are recorded, are sequentially positioned on an optical axis of the light emitted from the light source 20. As a result, film images recorded on the photographic film 26 are sequentially read by the CCD sensor 30, and a signal corresponding to each film image is outputted from the CCD sensor 30. The signal outputted from the CCD sensor 30 is converted by an analog/digital (A/D) converter 32 to digital image data and inputted to the image processing section 14.

In a scanner correcting portion 36 of the image processing section 14, dark correction in which a dark output level of a cell corresponding to each pixel is reduced from inputted scan data (data of red (R), green (G) and blue (B) inputted from the film scanner 12), density conversion in which data subjected to the dark correction is logarithmically converted to data which represents a density value, shading correction for correcting data subjected to the density conversion in accordance with ununiformity in the amount of light applied to the photographic film 26, and correction of a defective pixel in which among the data subjected to the shading correction, data of a cell (that is, so-called defective pixel) from which a signal corresponding to an amount of incident light is not outputted is interpolated from data of peripheral pixels and new data is generated, are sequentially performed. An output terminal of the scanner correcting portion 36 is connected to an input terminal of an I/O controller 38 and data subjected to the above-described various processing in the scanner correcting portion 36 is inputted, as scan data, to the I/O controller 38.

The input terminal of the I/O controller 38 is also connected to a data output terminal of an image processor 40, and image data subjected to image processing (described later in detail) is inputted to the I/O controller 38 from the image processor 40. Further, the input terminal of the I/O controller 38 is also connected to an input/output port 52 of a personal computer (PC) 44.

The personal computer 44 includes CPU 46, RAM (for example DRAM) 48, ROM (for example, ROM which allows rewriting of stored contents) 50 and an input/output port 52, which are connected together via a bus. Connected to the input/output port 52 of the personal computer 44 are a hard disk drive (HDD) 74, a display 70 comprised of cathode ray tube (CRT) or liquid crystal display (LCD), and information input equipment 72 comprised of a key board, a mouse and the like. Further, the personal computer 44 is equipped with an extension slot (not shown) connected to the input/output port 52. Connected to the extension slot are a driver (not shown) which performs reading/writing of data to an information storage medium such as a memory card or CD-R, and a communication control device for making communication with other information processing equipment. When file image data is inputted from outside via the extension slot, the inputted file image data is inputted to the I/O controller 38.

Output terminals of the I/O controller 38 are respectively connected to a data input terminal of the image processor 40 and the input/output port 52 of the personal computer 44, and also connected to the printer 16 via an I/F circuit 54. The I/O controller 38 outputs the inputted image data selectively to the above-described devices connected to the output terminals of the I/O controller 38.

In the present embodiment, two reading operations are carried out in the film scanner 12 for each of film images recorded on the photographic film 26 at different resolutions. In the first reading operation at a relatively low resolution (hereinafter referred to as pre-scan operation), even when the density of a film image is very low (for example, even when an underexposed negative image on a negative film is processed), reading for an entire region of the photographic film 26 is carried out under reading conditions (that is, amounts of light applied to the photographic film 26 for respective wavelengths of R, G and B, and time for charge accumulated in the CCD sensor 30) which are determined so as not to cause saturation of charge accumulated in the CCD sensor 30.

Data obtained by the pre-scan, that is, pre-scan data is inputted from the I/O controller to the personal computer 44. The personal computer 44 performs various processing including: determination of reading conditions at the second reading at a relatively high resolution (hereinafter referred to as fine scan) based on the inputted pre-scan data; set-up calculation for determining processing conditions of various image processing carried out, in the image processor 40, for image data obtained by the fine scan; test processing for testing as to whether the determined processing conditions are proper; setting processing for setting, in the image processor 40, the processing conditions determined via the test processing; and the like (described later in detail).

The file image data inputted to the image processing section 14 is also inputted to the personal computer 44 via the I/O controller 38. In the personal computer 44, the inputted file image data is made into low-resolution image data, and thereafter, set-up calculation, test processing, setting processing and the like are carried out for the low-resolution image data in the same manner as in the pre-scan data.

Image data inputted to the I/O controller 38 after fine scan is carried out for a film image in the film scanner 12 (that is, fine scan data) and file image data inputted to the image processing section 14, for which processing conditions are determined by the personal computer 14, are inputted from the I/O controller 38 to the image processor 40.

The image processor 40 is comprised of an image processing base plate on which an image processing circuit is mounted. The image processing circuit performs various image processing, such as density/color correction processing including gradation conversion and color conversion, pixel density conversion processing, hypertone processing for compressing gradation of an ultra low frequency brightness component of an image, and hypersharpness processing for highlighting sharpness while suppressing graininess. The image processor 40 performs various image processing for image data inputted thereto in such a manner that a program for performing image processing is down loaded to the image processing base plate by the personal computer 44 and parameters representing processing conditions determined by the personal computer 44 for each image are down loaded to the image processing base plate by the personal computer 44.

Other image processing which can be performed by the image processor 40 than the above-described processing includes: sharpness correction or soft-focus processing for an entire surface or a part of an image (for example, a region corresponding to the face of a human subject); image processing for intentionally changing an image tone (for example, image processing for finishing an output image in a monochromatic manner, image processing for finishing an output image like a portrait, and image processing for finishing an output image in a sepia tone); image processing for processing an image (for example, image processing for finishing a human subject existing in an original image, into a thin figure on a main image, and image processing for retouching a red-eye effect); and various aberration correcting processing of a lens-fitted film package (LF) for an image photographed by LF, in which deterioration in the image quality of an output image, which is caused by LF lens characteristics, for example, distortion aberration of LF lens, geometric distortion of an image caused by transverse chromatic aberration, color displacement, decrease in the lightness of a peripheral portion of an image caused by limb darkening of LF lens, or deterioration in the sharpness of an image caused by LF lens characteristics.

When image data subjected to image processing in the image processor 40 is used in recording an image on a photographic printing paper, the image data subjected to image processing in the image processor 40 is outputted, as recording image data, from the I/O controller 38 via the I/F circuit 54 to the printer 16. Further, when the image data subjected to image processing is outputted externally as an image file, the image data is outputted form the I/O controller 38 to the personal computer 44. As a result, in the personal computer 44, the image data to be outputted externally, which has been inputted from the I/O controller 38, is outputted, as an image file, externally (to the above-described driver, communication control device, or the like) via an extension slot.

The printer 16 includes an image memory 58, laser light sources 60 of R, G and B, and a laser driver 62 for controlling operation of the laser light sources 60. The recording image data inputted from the image processing section 14 is temporarily stored in the image memory 58, and thereafter, read out from the image memory. The read image data is used for modulation of laser light of R, G and B emitted from the laser light sources 60. The laser light emitted from the laser light sources 60 is scanned on the photographic printing paper 68 via a polygon mirror 64 and an fθ lens 66, and an image is recorded by exposure on the photographic printing paper 68. The photographic printing paper 68 on which an image is recorded by exposure, is conveyed to a processor section 18, in which various processing including color development, bleach-fix, washing and drying is carried out therefor. As a result, the image recorded by exposure on the photographic printing paper 68 is visualized.

Next, operation of the present embodiment will be described. Various application programs including an image processing program referred to as an image processing system, and an emergency stop execution program for urgently stopping an image processing system (in the embodiment in which image processing-related equipment such as the film scanner 12 and the printer 16 is connected to the image processing section 14 as in the present embodiment, the image processing-related equipment is also urgently stopped), and resetting (that is, transition to an initial state of the image processing system) or restarting the image processing system, are in advance installed in HDD 74 of the personal computer 44 in the image processing section 14. The image processing system is activated by turning on a power source of the image processing section 14, and image processing programs are read out from the HDD 74 to the RAM 48. Due to the read programs being sequentially executed by the CPU 46, first, a process (an image processing system-main process; also see FIGS. 2 and 3) is generated, and subsequently, system initialization processing is performed by the image processing system-main process.

The system initialization processing is processing that prepares for performing various types of processing (described later in detail) including image processing by the image processing system. For example, an operation of turning on a power source of various devices (for example, the film scanner 12 and the printer 16) connected to the image processing section 14, holding (setting) of a memory region used for image processing, initialization including detection of origins of mechanical facilities of various devices (for example, the film carrier 24 of the film scanner 12, a zoom mechanism or AF mechanism of the zoom lens 28, the polygon mirror 64 of the printer 16, and the like) connected to the image processing section 14 or reset of a position detection value, and down loading of a program to the image processing base plate of the image processor 40 are performed. These types of processing corresponds to system initialization processing described in the second and third aspects of the present invention, and a relatively long time (many hours) is required until such processing is completed.

Figure 4:
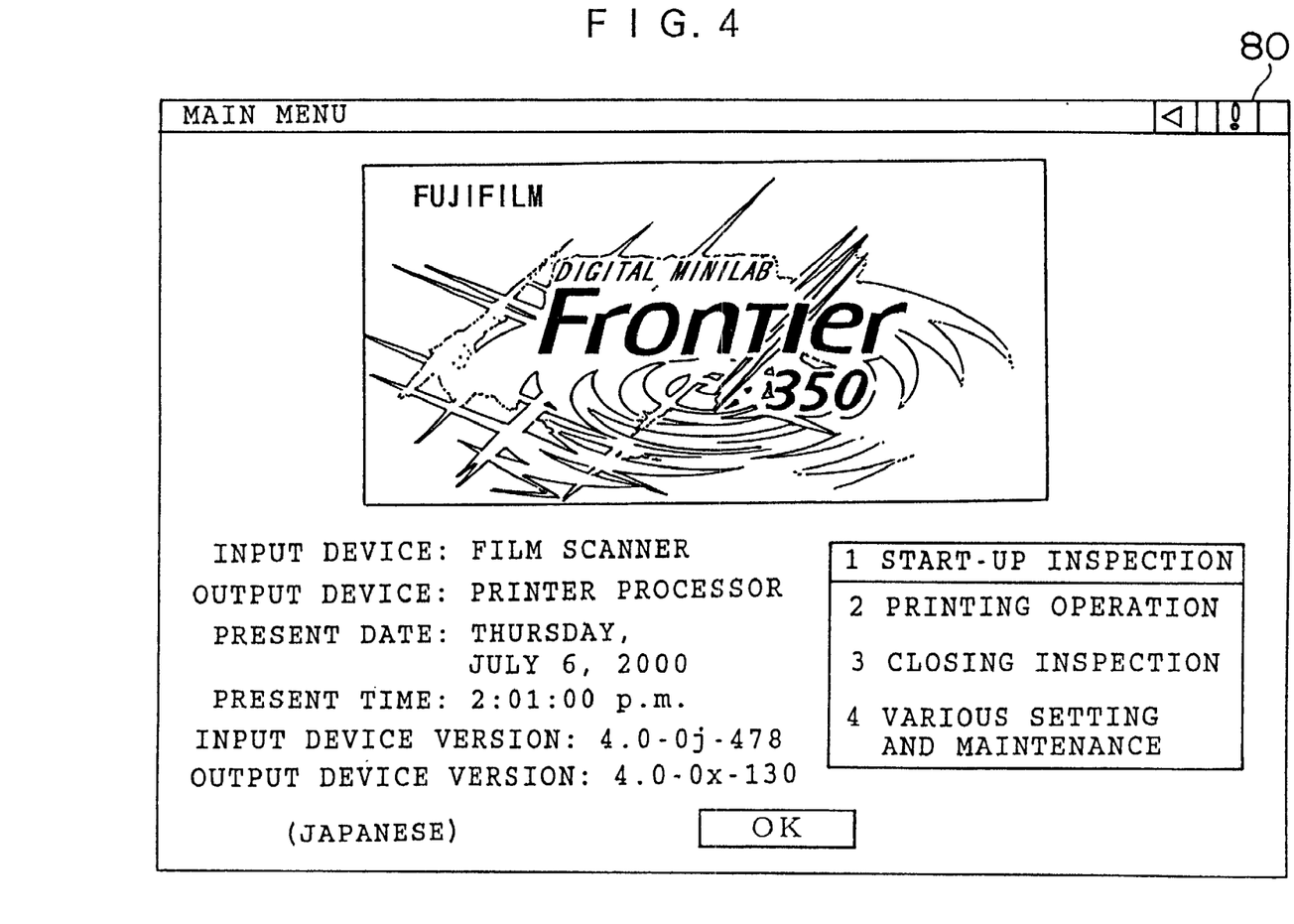
FIG. 4 is an image diagram showing an example of a main menu screen.

When the system initialization processing has been completed, a main menu screen as shown in FIG. 4 is displayed, as an example, on a display 70 by the image processing system-main process. The main menu screen is structured in such a manner that titles of plural kinds of processing ("start-up inspection", "printing operation", "closing inspection", and "various setting and maintenance") are displayed in a tabular form. When an operator operates the information input equipment 72 and selects the title of a specific processing as processing to be executed, an image processing system-subprocess corresponding to the selected title of processing is generated by the image processing system main process, and processing corresponding to the selected processing title is performed by the image processing system.

The image processing system-subprocess may be a program in an execute form, or may be an execution file in the form of dynamic link library (DLL), OCX or the like. A process corresponding to the selected processing title can be carried out by the generated image processing system-subprocess singly or by the generated image processing system-subprocess and the image processing system-main process cooperating with each other.

Next, a description will be given of processing which is performed by an image processing system (in practice, CPU 46 of the personal computer 44) when the "printing operation" is selected as processing to be performed. When the "printing operation" for film images recorded on the photographic film 26 is selected, the image processing system controls operation of the film scanner 12 so as to allow sequential pre-scan for each film image recorded on the photographic film 26 under constant reading conditions.

When pre-scan data obtained by pre-scan in the film scanner 12 is inputted to the personal computer 44 via the I/O controller 38, in the image processing system, a frame position of each film image is determined based on the inputted pre-scan data, and data corresponding to a film image recording region on the photographic film 26, that is, pre-scan image data is extracted. Further, based on the extracted pre-scan image data, the size of each film image is determined and an image characteristic quantity such as density is calculated, and reading conditions in performing fine scan by the film scanner 12 are determined for the photographic film 26 for which pre-scan is performed, for each film image.

In the image processing system, calculation of image characteristic quantity including extraction of a main portion (for example, a region corresponding to the face of a human subject, that is, a face region) in a film image is carried out based on the extracted pre-scan image data, and processing conditions of various image processing for image data obtained by fine scan in the film scanner 12, that is, fine-scan image data are automatically determined by calculation (set-up calculation).

Further, in the image processing system, based on the determined processing conditions for image processing, image processing equivalent to image processing performed for fine-scan image data in the image processor 40, is performed for pre-scan image data, and simulation image data is thereby generated. The generated simulation image data is converted to a signal for displaying an image on a display, and a simulation image is displayed on the display based on the signal.

The image quality or the like of the displayed simulation image is inspected by an operator. When information indicating correction of processing conditions is inputted as the result of inspection via the information input equipment 72, processing such as recalculation of processing conditions for image processing is performed based on the inputted information, and processing such as generation of simulation image data, display of a simulation image, and the like is repeated until information representing, as the result of inspection, that the image quality or the like of a simulation image is proper is inputted from an operator via the information input equipment 72 (test processing).

In parallel with the above-described set-up calculation and test processing, in the image processing system, based on the determined frame position and the calculated reading conditions, the operation of the film scanner 12 is controlled so that fine scan is sequentially carried out for each film image recorded on the photographic film 26 under corresponding reading conditions. Further, the image processing system controls the I/O controller 38 so as to input fine-scan image data obtained by fine scan to the image processor 40, and down loads, for the inputted fine-scan image data, parameters representing processing conditions determined via the test processing, to the image processing base plate of the image processor 40 by the image processor 40.

As a result, various image processing is carried out by the image processor 40 for fine-scan image data under the processing conditions determined via the test processing. The image data subjected to various image processing is outputted, as recording image data, to the printer 16 via the I/O controller 38 and the I/F circuit 54, and recorded by exposure, as an image, on the photographic printing paper 68 by the printer 16. As is also clear from the foregoing, the image processing system corresponds to image processing section of the present invention.

Next, a description will be given of processing (that is, processing to which a method for controlling an image processing apparatus according to the present invention is applied) carried out when an abnormal state is caused in the image processing system. As an example, in a screen (window) shown on the display 70 of the image processing system as shown in FIG. 4, an icon 80 (hereinafter referred to as an emergency stop switch 80) is indicated (displayed) at a position corresponding to an upper right corner. The icon 80 is used, when an abnormal state is caused in the image processing system, to urgently stop the image processing system and reset or restart the image processing system (and image processing-related equipment(s)).

Figure 5:
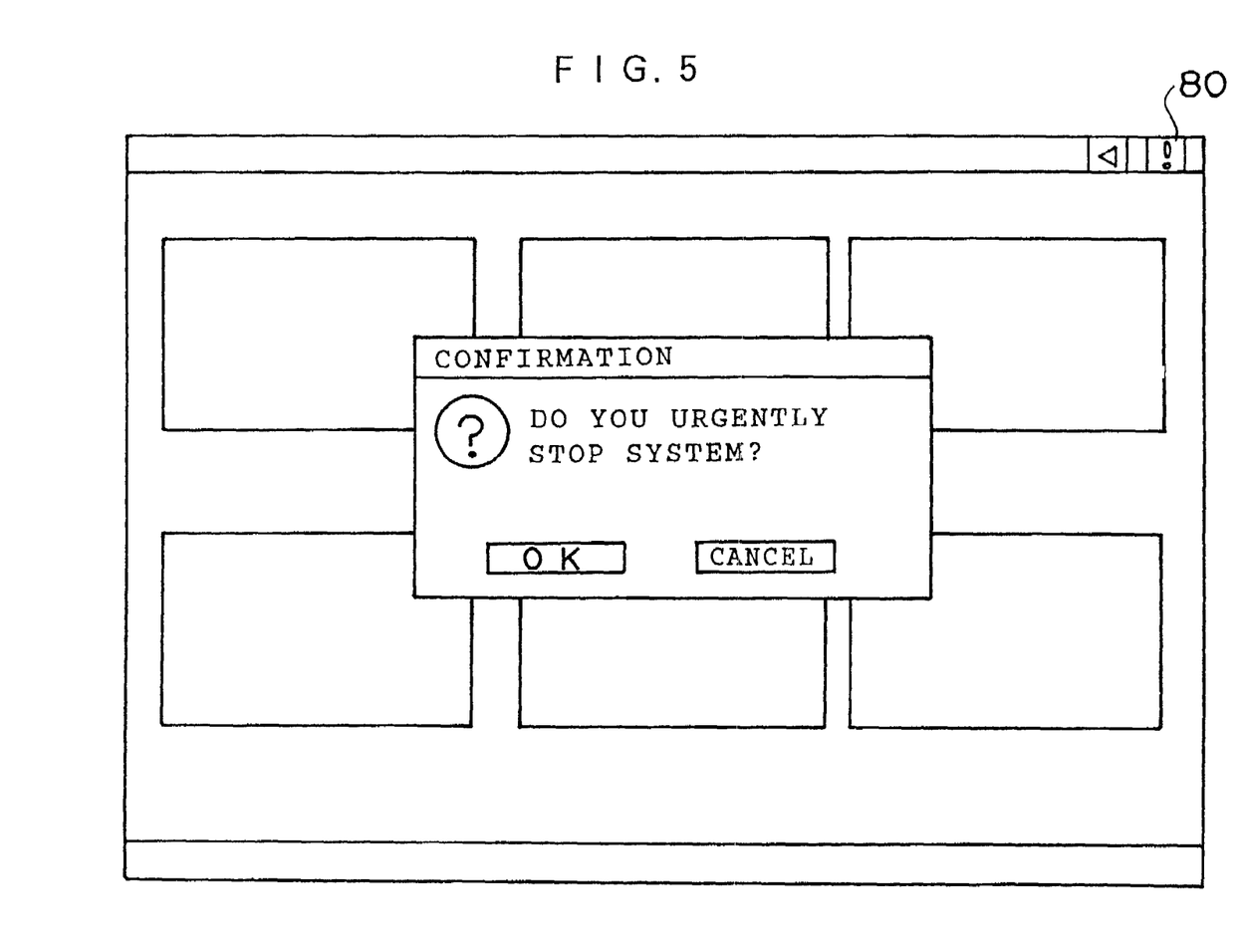
FIG. 5 is an image diagram showing an example of a screen for confirmation of emergency stop.

When an abnormal state of the image processing system, for example, an inoperative state thereof is recognized by an operator, the operator operates a mouse or the like of the information input equipment 72 to click the emergency stop switch 80. When the emergency stop switch 80 is clicked, an emergency stop execution program is read out from HDD 74 to RAM 48, and the read program is sequentially executed by CPU 46. As a result, an emergency stop execution process (see FIGS. 2 and 3) is first generated, and subsequently, an emergency stop confirmation screen (window) as shown in FIG. 5 is, as an example, shown on the display 70 by the emergency stop execution process.

Indicated on the emergency stop confirmation screen are a message by which an operator confirms as to whether emergency stop (and reset or restart) of the image processing system (and image processing-related equipment) is performed, and boxes (that is, boxes in which "OK" and "cancel" are respectively indicated) provided for confirmation of an operator's intention. The emergency stop execution process is provided so as to monitor as to whether either box has been clicked.

Indication of the emergency stop confirmation screen and monitoring as to whether either box has been clicked by the emergency stop execution process correspond to abnormal state detecting section of the present invention. Specifically, the button represented as "OK" corresponds, with the emergency stop switch 80, a restart button described in the fourth aspect of the present invention. Monitoring as to whether the button represented as "OK" has been clicked, corresponds to abnormal state detecting section described in the fourth aspect of the present invention. The emergency stop execution process ends when an operator operates a mouse or the like to click the box represented as "cancel".

Figure 2:
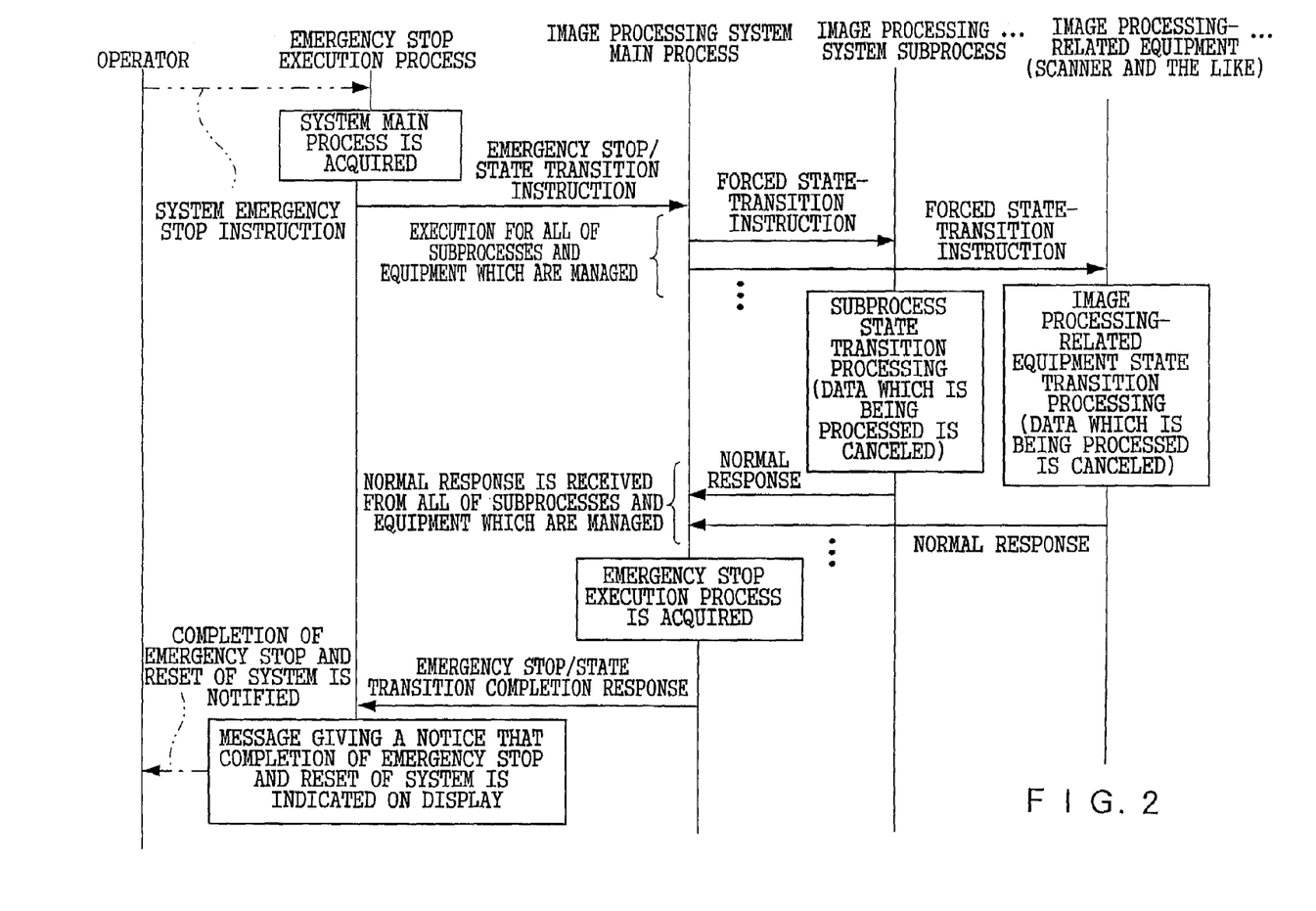
FIG. 2 is a diagram showing a processing sequence when emergency stop of an image processing system and transition to an initial state thereof proves successful.

When the operator operates a mouse or the like to click the box represented as "OK" in the emergency stop confirmation screen, the emergency stop execution process detects that an instruction for execution of emergency stop (and reset or restart) of the image processing system (and the image processing-related equipment) is given, due to an abnormal state being caused in the image processing system, as shown as "system emergency stop instruction" in FIG. 2. In order to make trial of transition of the image processing system (and the image processing-related equipment) to an initial state, information which identifies the image processing system-main process is acquired from an operating system (OS), and based on the information acquired from the OS, an instruction for emergency stop and state transition (transition to an initial state, that is, a state at the time of starting) of the image processing system (and image processing-related equipment) is given to the image processing system-main process (see "emergency stop/state transition instruction" in FIG. 2).

When the instruction for emergency stop and state transition of the image processing system (and image processing-related equipment) is given from the emergency stop execution process, the image processing-main process gives an instruction for all of image processing system-subprocesses managed thereby (which all subprocesses are generated by the image processing system-main process itself, and states in which the subprocesses are being executed (not finished) are grasped by the image processing system-main process itself) and also for the image processing-related equipment (in the present embodiment, the film scanner 12 and the printer 16) so as to stop processing (if they are in the state of processing) and make transition to an initial state by force (see "forced state transition instruction" in FIG. 2).

As a result, in each subprocess of the image processing system, so long as there is any data (for example, image data) which is being processed, it is cancelled (discarded) and processing which is being executed is stopped, and processing for transition to the initial state is carried out. For example, among subprocesses of the image processing system, a subprocess for carrying out an operation of analyzing image data or image processing, requests the OS to hold a storage region for storing image data in a storage space of RAM 48, and stores image data in the storage region assigned by the OS to allow analysis or image processing of image data. In the subprocess for which the storage region of image data is assigned, after processing for requesting the OS to release the assigned storage region, the state of the subprocess is transited (changed) to the initial state thereof.

Further, in the film scanner 12 and the printer 16 which are the image processing-related equipment, processing which is being executed, is stopped and data (for example, image data) which is stored in memory or the like and being processed, is cancelled. The film scanner 12 also discharges, from the film carrier 24, the photographic film 26 set in the film carrier 24. When the above-described processing is completed, the film scanner 12 and the printer 16 are each transited (changed) to the initial state.

In the subprocess and the image processing-related equipment, in which transition to the initial state is normally completed, as shown as "normal response" in FIG. 2, a notice that processing with "forced state transition instruction" has been normally completed, is given to the image processing system-main process. In the image processing system-main process, a timer is started after an instruction for "forced state transition" is given to all of image processing system-subprocesses and image processing-related equipment, which are managed thereby, and it is monitored as to whether a normal response is received from all of the subprocesses and image processing-related equipment within a specified time.

When an abnormal state of the image processing system results from, for example, inconsistency of the state between processes of the image processing system or inconsistency of the state between the image processing system and the image processing-related equipment, transition to the initial state in each subprocess and each of image processing-related equipment can be normally performed. Therefore, the image processing system-main process receives, within a specified time, a normal response from all of subprocesses and image processing-related equipment which are managed thereby. As a result, the image processing system-main process makes a determination that emergency stop of the image processing system (and the image processing-related equipment) and transition to the initial state(reset), indicated by the emergency stop execution process, has been normally completed, that is, an abnormal state of the image processing system is settled and restored, and acquires, from the OS, information which identifies the emergency stop execution process.

As shown in "emergency-stop/state-transition completion response" in FIG. 2, a notice that emergency stop of the image processing system (and the image processing-related equipment) and transition to the initial state thereof has been normally completed, is given to the emergency stop execution process. At this time, the image processing system-main process also gives information that, among film images recorded on the photographic film 26, image processing for film images subsequent to which frame has not been completed (information which film images has not been subject to image processing), due to emergency stop of the image processing system (and the image processing-related equipment) at the present time.

Acquisition of information which identifies the image processing system-main process and "emergency stop/state transition instruction" given to the image processing system-main process by the emergency stop execution process, "forced state transition instruction" given by the image processing system-main process to all of image processing system-subprocesses and image processing-related equipment, which are managed thereby, a determination as to whether "emergency-stop/state-transition completion response" has been received from the image processing system-subprocess and image processing-related equipment within a specified time, and "emergency-stop/state-transition completion response" for the emergency stop execution process each correspond to trial section of the present invention. Particularly, the "forced state transition instruction" for the subprocess corresponds to the trial section described in the fifth aspect of the present invention, the "forced state transition instruction" for the image processing-related equipment corresponds to the trial section described in the sixth aspect of the present invention, and the determination as to whether the "emergency stop/state transition completion response" is given within a specified time, corresponds to the trial section described in the seventh aspect of the present invention.

Figure 6:
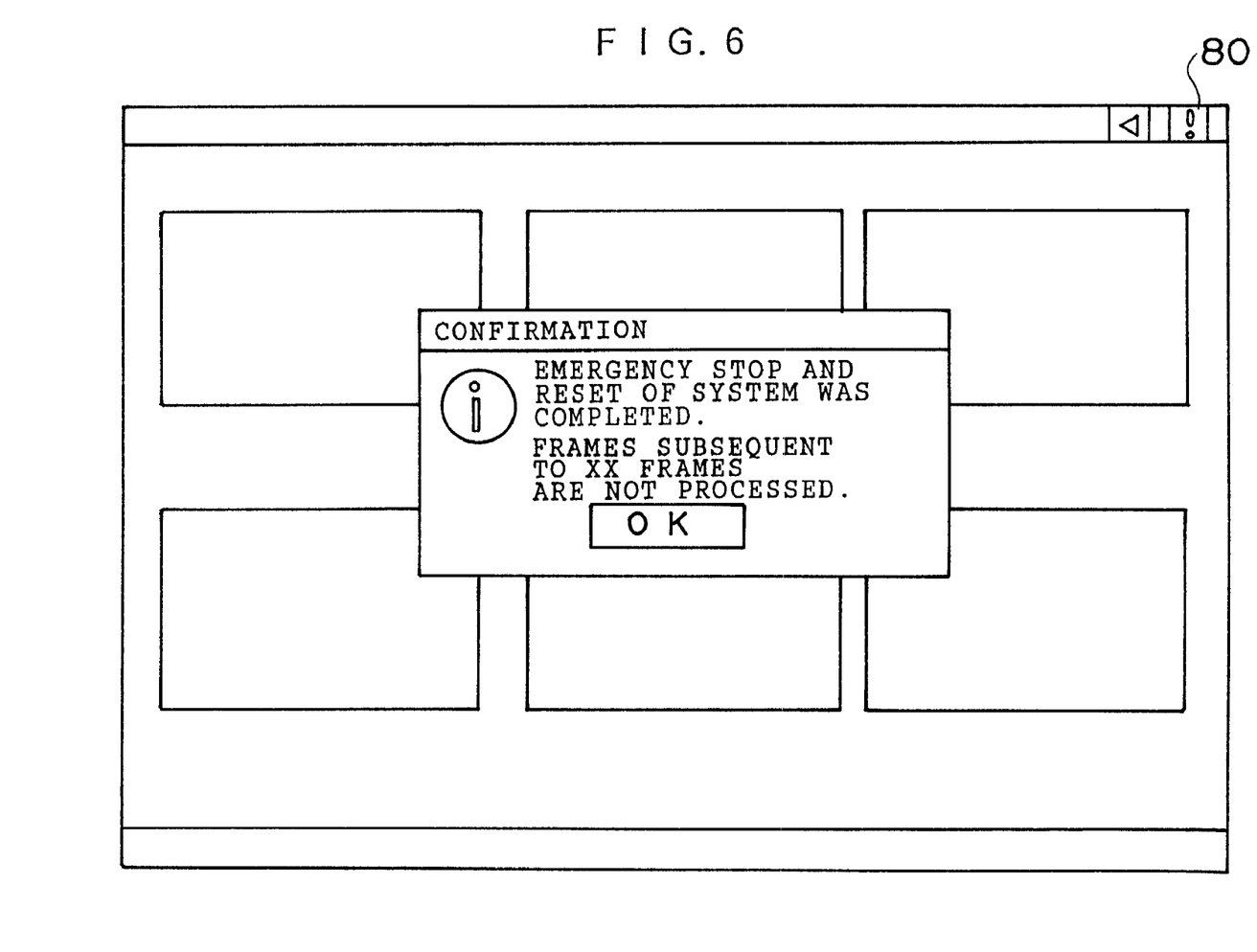
FIG. 6 is an image diagram showing an example of a notification screen for indicating completion of emergency stop.

When a notice that emergency stop of the image processing system (and the image processing-related equipment) and transition to the initial state thereof has been normally completed, is given to the emergency stop execution process, the emergency stop execution process indicates, as an example, a emergency-stop completion notification screen (window) as shown in FIG. 6 on the display 70. Displayed on the emergency-stop completion notification screen are a message for notifying an operator that emergency stop of the image processing system (and the image processing-related equipment) and reset (transition to the initial state) has been completed, and a box which prompts the operator to perform a confirming operation, that is, a box represented as "OK". Displaying the emergency-stop completion notification screen corresponds to notification section described in the eighth aspect of the present invention.

By referring to the emergency-stop completion notification screen, an operator can easily recognize that emergency stop and reset of the image processing system (and the image processing-related equipment) has been normally performed, the image processing system has been restored (recovered), and an operation needs to be restarted from which film image. Various processing by the image processing system can be restarted by clicking the box represented as "OK" in the emergency-stop completion notification screen using a mouse or the like.

As is previously described, at the starting of the image processing system-main process, long-time needed system initialization processing such as initialization of various mechanisms of the image processing-related equipment connected to the image processing section 14, down loading of a program to the image processing base plate of the image processor 40, and the like is carried out. However, in the case of the above-described emergency stop and transition to the initial state of the image processing system (and the image processing-related equipment), the image processing system can be restored by simple processing without performing system initialization processing. Therefore, an abnormal state of the image processing system can be settled in a very short time and an interrupt time of an operator's operation caused by an abnormal state of the image processing system can be restrained to the minimum.

When the abnormal state of the image processing system is caused by, for example, abnormality of a communication system, a specified subprocess or image processing-related equipment cannot normally make transition to the initial state, or cannot return a response to the "forced state transition instruction".

Figure 3A:
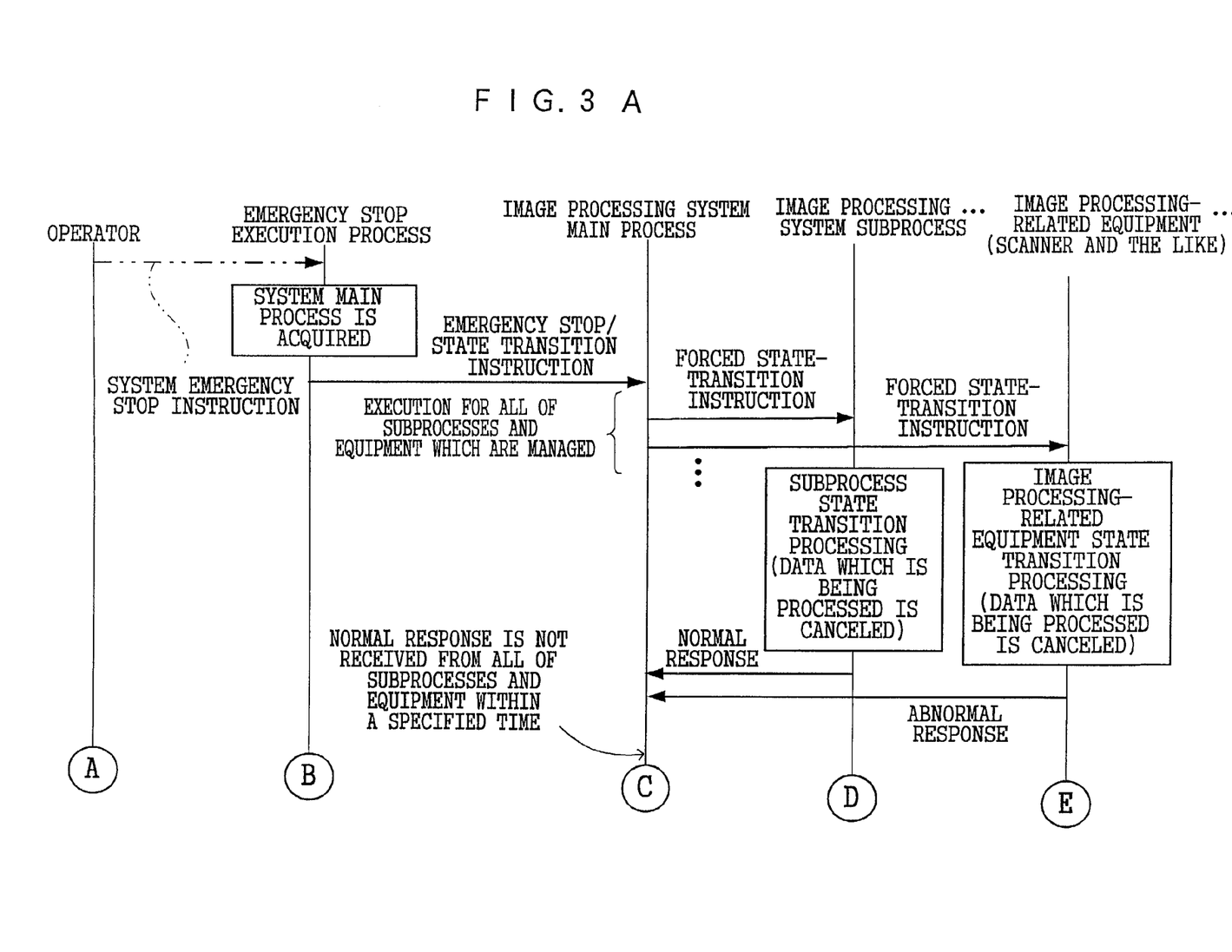
FIG. 3A is a diagram showing a processing sequence when emergency stop of an image processing system and transition to an initial state thereof results in a failure and a personal computer is shut down and restarted.
Figure 3B:
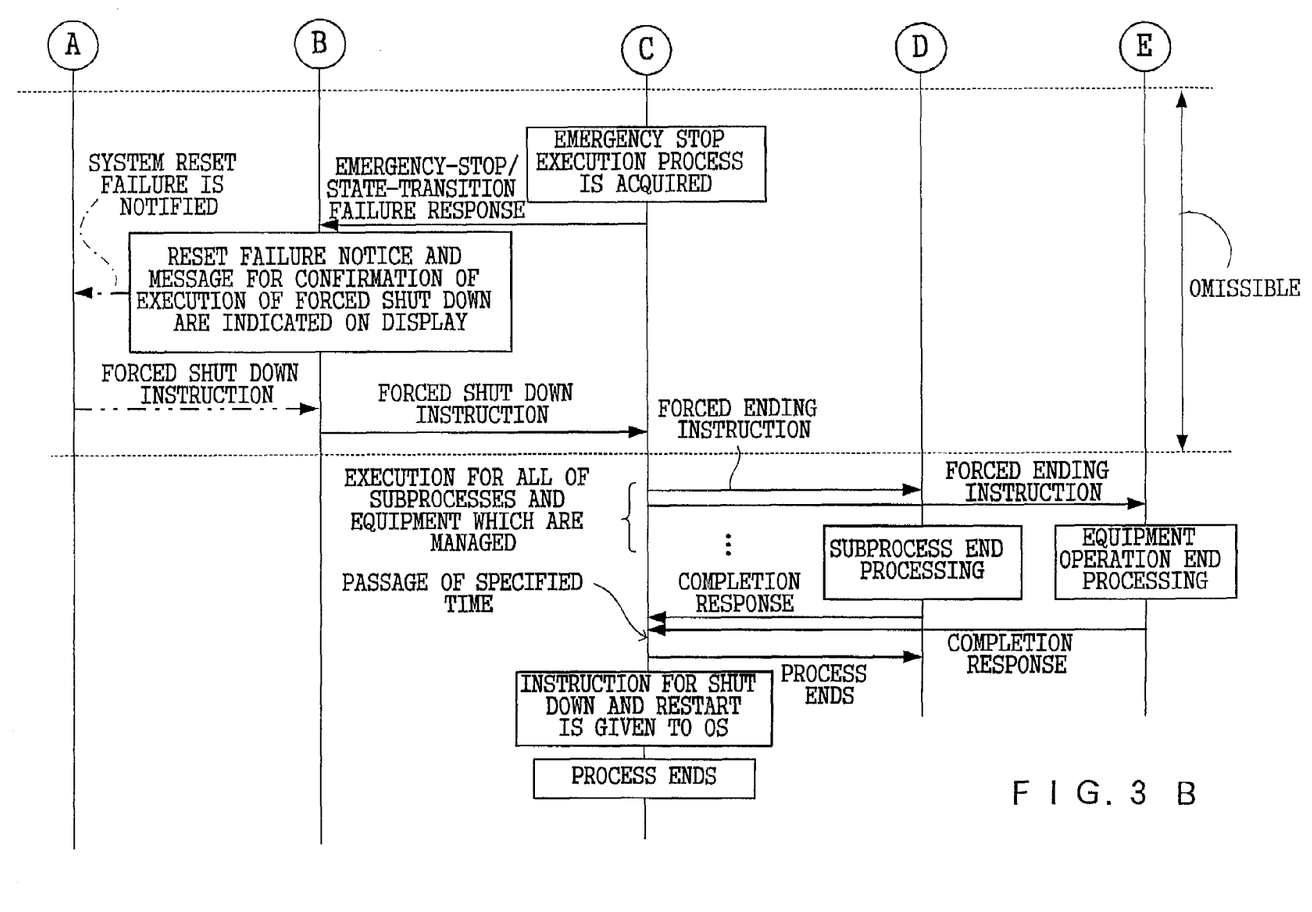
FIG. 3B is a diagram showing a processing sequence when emergency stop of an image processing system and transition to an initial state thereof results in a failure and a personal computer is shut down and restarted.

When the image processing system-main process giving an instruction for "forced state transition" to each of the subprocesses and image processing-related equipment does not receive, within a specified time, a normal response from all of subprocesses and image processing-related equipment, which are managed thereby, for example, an abnormal response is received from a specified subprocess or image processing-related equipment, or no response is received from a specified subprocess or image processing-related equipment within a specified time (FIG. 3 shows, as an example, a case in which an abnormal response is received from the image processing-related equipment), the image processing system-main process makes a determination that emergency stop of the image processing system (and the image processing-related equipment) and transition to the initial state thereof, for which instruction has been given by the emergency stop execution process, has failed. The image processing system-main process acquires, from the OS, information which identifies the emergency stop execution process, and as shown in "emergency-stop/state-transition failure response" in FIG. 3, the image processing system-main process gives, to the emergency stop execution process, a notice that emergency stop of the image processing system (and image processing-related equipment) and transition to the initial state thereof has failed.

Figure 7:
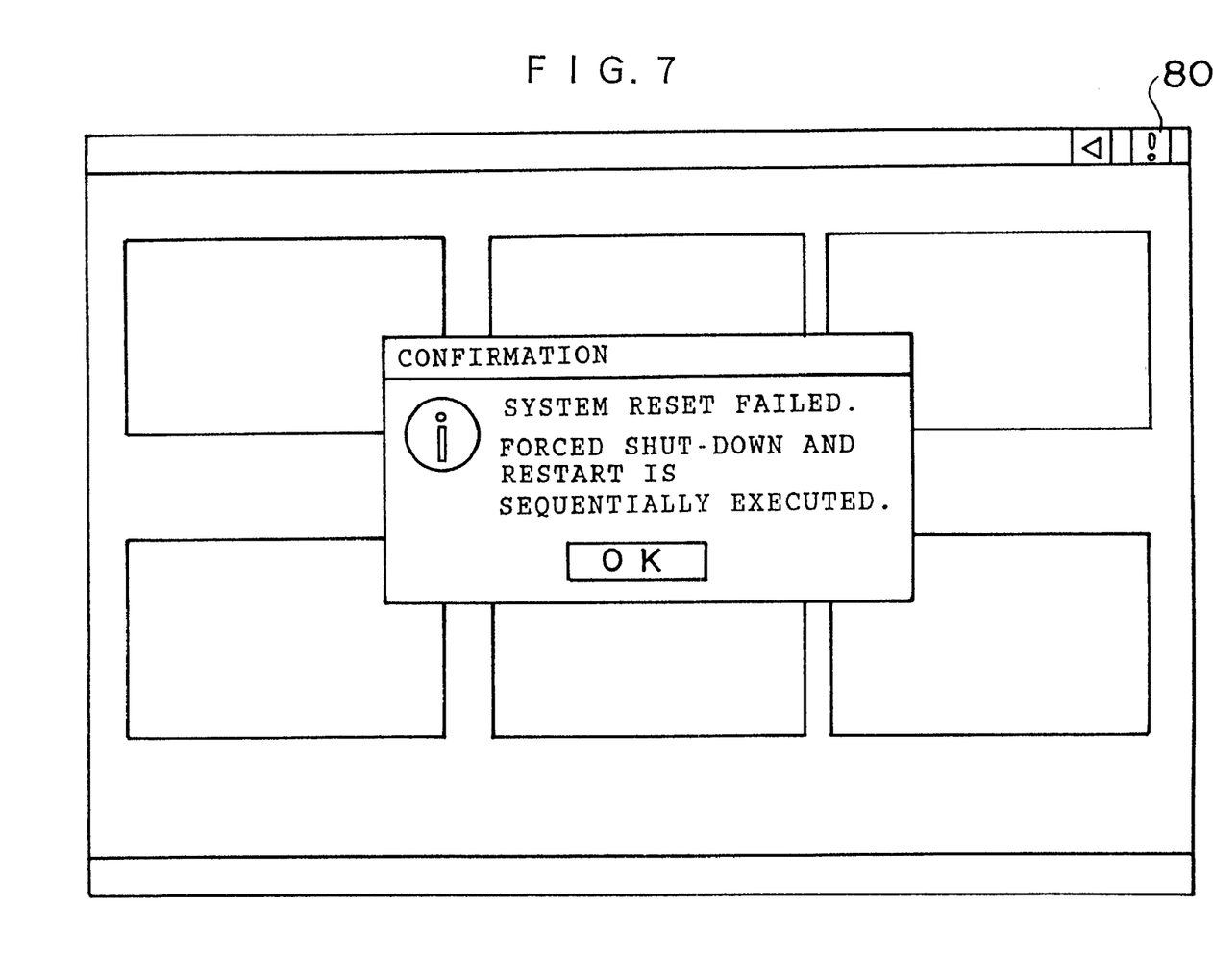
FIG. 7 is an image diagram showing an example of a notification screen for indicating a failure in emergency stop.

When the emergency stop execution process receives the notice that emergency stop and reset (transition to the initial state) of the image processing system (and the image processing-related equipment) has failed, an emergency stop failure notification screen (window) as shown in FIG. 7 is displayed, as an example, on the display 70. Displayed on the emergency stop failure notification screen are a message for giving, to an operator, a notice that emergency stop and reset of the image processing system (and the image processing-related equipment) has failed, a message for giving, to an operator, a notice that system initialization processing is performed by restarting an entire image processing section 14 including the OS or the image processing system after the image processing section 14 including the personal computer 44 has entirely been forcedly shut down, and a box (represented as "OK") which prompts an operator to perform a confirming operation. Displaying the emergency stop failure notification screen also corresponds to notification section described in the eighth aspect of the present invention.

Referring to the emergency stop failure notification screen makes it possible for an operator to easily recognize that emergency stop and reset of the image processing system has failed, and the image processing section 14 needs to be forcedly shut down so as to settle the abnormal state of the image processing system (see "system reset failure is notified" in FIG. 3). Further, the operator can acknowledge forced shut-down of the image processing section 14 and restart of the entire image processing section 14 by clicking a box represented as "OK" in the emergency stop failure notification screen using a mouse or the like (see "forced shut-down instruction" shown in FIG. 3).

When the box represented as "OK" in the emergency stop failure notification screen is clicked by an operator (processing executed in the emergency stop execution process and the image processing system-main process subsequent to the clicking corresponds to start control section described in the ninth aspect of the present invention), the emergency stop execution process gives, to the image processing system-main process, an instruction for executing processing required for forced shut-down of the image processing section 14 (see "forced shut-down instruction" in FIG. 3). When the image processing system-main process receives the above-described instruction from the emergency stop execution process, the image processing system-main process gives, to all of image processing system-subprocesses and image processing-related equipment, which are managed thereby, an instruction for preprocessing for bringing the process to an end irrespective of the state in which the processing is being executed or not (see "forced ending instruction" in FIG. 3).

As a result, in each subprocess of the image processing system, if there is data (for example, image data) which is being processed, it is cancelled and processing which is being execution is stopped. Further, if there is a device managed by the subprocess, ending processing for the device is performed. The subprocess in which the above-described processing has been completed, give to the image processing system-main process a notice that processing with "forced ending instruction" has normally ended, as shown by "completion response" in FIG. 3. Further, in the image processing-related equipment as well, if there is data which is being processed, it is cancelled and processing which is being executed is stopped. A notice that processing with "forced ending instruction" has normally ended, is given to the image processing system-main process.

In the image processing system-main process, a timer is started after an instruction for "forced ending" is given to all of the image processing system-subprocesses and image processing-related equipment, which are managed thereby. When a specified time has elapsed, the image processing system-main process gives an instruction for stopping the process to all of subprocesses managed thereby irrespective of a determination as to whether a completion response has been received from all of subprocesses and image processing-related equipment which are managed thereby (see "process ends" in FIG. 3). As a result, all of subprocesses of the image processing system ends. The image processing system-main process requests the OS to shut down the personal computer 44 and restart the personal computer 44, and the image processing system-main process itself ends.

After the OS has performed preprocessing for shut-down and restart of the personal computer 44, the OS shuts down the personal computer 44 (the power source of the image processing section 14 operates with the power source of the personal computer 44, and accompanied with shut-down of the personal computer 44, the image processing section 14 is entirely shut down). Thereafter, when the OS is restarted and application programs including the image processing system are restarted, the entire image processing section 14 is restarted. Due to the entire image processing section 14 being shut down, thereafter restarted, and system initialization processing being performed (accompanied with the system initialization processing, the power source of the image processing-related equipment is turned on again and initialization of mechanical facilities mechanism, or the like is performed), an abnormal state of the image processing system is settled and the image processing system is restored irrespective of causes of the abnormal state of the image processing system (even when the abnormal state results from abnormality of a communication system or the like).

When the image processing section 14 is entirely shut down and restarted as described above, system initialization processing by the image processing system is executed again in addition to processing performed when the power source of the general personal computer is turned on. Therefore, an operator must interrupt an operation using the image processing system for a long period of time. However, in the present embodiment, for example, when an abnormal state of the image processing system occurs due to inconsistency of the state between processes of the image processing system, the image processing system is restored only by making transition of each of subsystems of the image processing system and the image processing-related equipment to an initial state (that is, without performing the system initialization processing). Accordingly, an average restoration time required when an abnormal state is caused in the image processing system can be shortened, and an influence on an operational man-hour of an operator by the abnormal state of the image processing system can be alleviated.

In the foregoing, a notice as to whether emergency stop of the image processing system (and the image processing-related equipment) and transition to the initial state thereof has succeeded or failed is given by indicating the emergency stop completion notification screen shown in FIG. 6 or the emergency stop failure notification screen shown in FIG. 7 on the display 70. However, the present invention is not limited to the same. The notice may be given by other section using a voice or the like.

Further, when emergency stop and transition to the initial state of the image processing system has failed, a notice that emergency stop and reset (transition to the initial state) of the image processing system (and image processing-related equipment) has failed, is given to an operator and an operator is allowed to confirm execution of processing restarting after the entire image processing section 14 have been forcedly shut down. However, the present invention is not limited to the same. Processing in a portion represented as "omissible" in FIG. 3 is omitted and when emergency stop and transition to the initial state of the image processing system (and the image processing-related equipment) has failed, the entire image processing section 14 may be immediately shut down and restarted.

In the foregoing, there was described, as an example of the image processing apparatus according to the present invention, the digital laboratory system 10 in which the film scanner 12 and the printer 16 are provided as image processing-related equipment. However, the present invention can also be applied to an image processing apparatus in which no image processing-related equipment is provided.

As described above, according to the first aspect of the present invention, in an image processing section which performs system initialization processing for image processing when a power source is turned on or when starting, and performs image processing in accordance with an instruction for execution of image processing, when an abnormal state is detected, a trial section makes a trial of eliminating the abnormal state by controlling so that at least the image processing section undergoes a transition to an initial state without performing the system initialization processing. Accordingly, an excellent effect is obtained, wherein an average restoration time when an abnormal state, for example, an inoperable state occurs in the image processing section can be shortened.

According to the fourth aspect of the present invention, in the first aspect, the abnormal state of the image processing section is detected based on a determination as to whether a restart button for indicating restart of the image processing section has been turned on. Accordingly, in addition to the above-described effect, occurrence of the abnormal state in the image processing section can be detected by a simple structure, and occurrence of inconvenience in which a fixed load of the image processing apparatus increases, or the like can also be prevented.

According to the fifth aspect of the present invention, in the first aspect, the image processing section is allowed to undergo a transition to an initial state by giving, to the plural subprocesses of the image processing section, an instruction for transition to an initial state. Accordingly, in addition to the above-described effects, transition of the image processing section to the initial state can easily be made without performing the system initialization processing.

According to the seventh aspect of the present invention, in the fifth or sixth aspect, it is determined that, based on a determination as to whether a normal response to the instruction for transition to an initial state has been received from all subjects for the instruction within a predetermined time, transition to an initial state has succeeded or failed. Accordingly, in addition to the above-described effects, a determination can be easily and reliably made as to whether transition to an initial state has succeeded or failed.

According to the eighth aspect of the present invention, in the first aspect, a notification section is provided which gives a notice that the transition to an initial state by the trial section has succeeded or failed. Accordingly, in addition to the above-described effects, an operator or the like can easily recognize as to whether control using the trial section has succeeded and whether restart of the image processing section including the system initialization processing may be needed.

According to the ninth aspect of the present invention, in the first aspect, when the transition to an initial state by the trial section has failed, the image processing section is controlled so that the image processing section is restarted to allow the system initialization processing. Accordingly, in addition to the above-described effects, when an abnormal state such as an inoperative state occurs in the image processing section, the image processing section can reliably be restored without requiring an operator's hand or the like.

According to the tenth aspect of the present invention, in an image processing section which performs system initialization processing for image processing when a power source is turned on or when starting, and performs image processing in accordance with an instruction for execution of image processing, when an abnormal state is detected, a trial of eliminating the abnormal state is made by controlling so that at least the image processing section undergoes a transition to an initial state without performing the system initialization processing, and the image processing section is controlled so that, when the transition to an initial state has failed, the image processing section is restarted and performs the system initialization processing. Accordingly, an average restoration time when an abnormal state such as an inoperative state is caused, can be reduced, and the image processing section can be restored without requiring an operator's hand or the like.

What is claimed is:

1. An image processing apparatus comprising:
   an image processing section which performs system initialization processing for image processing when a power source is turned on or at a starting, and performs image processing in accordance with an instruction for execution of image processing;
   an abnormal state detecting section for detecting generation of an abnormal state of the image processing section after the system initialization processing has been performed; and
   a trial section which, when the abnormal state of the image processing section is detected by the abnormal state detecting section, makes a trial of controlling the image processing section to cause a process or piece of equipment related to the image processing to make a transition to an initial state without performing the system initialization processing
   wherein, if the trial made by the trial section fails to cause the process or piece of equipment to make the transition to the initial state, the system initialization processing is performed.

2. An image processing apparatus according to claim 1, wherein the system initialization processing by the image processing section includes at least one of an operation of turning on again a power source of the image processing section, and an operation of downloading a parameter or a program to an image processing substrate, which is mounted in the image processing apparatus and is a part of the image processing section.

3. An image processing apparatus according to claim 1, further comprising equipment related to the image processing,
   wherein the system initialization processing performed by the image processing section includes at least one of an operation of turning on again a power source of the equipment related to the image processing and initializing the equipment related to the image processing, and an operation of downloading a parameter or a program to the equipment related to the image processing.

4. An image processing apparatus according to claim 1, wherein the abnormal state detecting section is provided so as to detect the abnormal state of the image processing section based on a determination as to whether a restart button for indicating restart of the image processing section is turned on.

5. An image processing apparatus according to claim 1, wherein the image processing section comprises a single main process and plural sub-processes, and
   the trial section causes the transition to an initial state to occur by giving, to the plural sub-processes of the image processing section, an instruction for transition to an initial state.

6. An image processing apparatus according to claim 5, wherein the trial section makes a determination that, based on a determination as to whether a normal response with respect to the instruction for transition to an initial state is received from the sub-processes within a predetermined time, the transition to an initial state succeeds or fails.

7. An image processing apparatus according to claim 1, further comprising equipment related to the image processing,
   wherein the trial section causes the transition of the equipment related to the image processing to an initial state by giving, to the equipment related to the image processing, an instruction for transition to an initial state.

8. An image processing apparatus according to claim 7, wherein the trial section makes a determination that, based on a determination as to whether a normal response with respect to the instruction for transition to an initial state is received from the equipment related to the image processing within a predetermined time, the transition to an initial state succeeds or fails.

9. An image processing apparatus according to claim 1, further comprising a notification section for giving notice that the transition to an initial state by the trial section succeeds or fails.

10. An image processing apparatus according to claim 1, wherein the system initialization processing includes downloading a program to an image processing substrate mounted in the image processing apparatus.

11. An image processing apparatus according to claim 1, wherein the image processing section performs a main process and manages at least one sub-process, and the trial section controls the at least one sub-process to transit to an initial state in response to detection of the abnormal state.

12. An image processing apparatus comprising:
    an image processing section which performs system initialization processing for image processing when a power source is turned on or at a starting, and performs image processing in accordance with an instruction for execution of image processing;

an abnormal state detecting section for detecting generation of an abnormal state of the image processing section; and a trial section which, when the abnormal state of the image processing section is detected by the abnormal state detecting section, makes a trial of eliminating the abnormal state by controlling so that at least the image processing section transits to an initial state without performing the system initialization processing; and a start control section which, when the transition to an initial state by the trial section fails, controls the image processing section so that the image processing section is restarted and performs the system initialization processing.

13. A method for controlling an image processing apparatus including an image processing section which performs system initialization processing for image processing when a power source is turned on or at a starting, and performs image processing in accordance with an instruction for execution of image processing, said method comprising the steps of:

when an abnormal state of the image processing section is detected after the system initialization processing has been performed, making a trial of controlling the image processing section to cause a process or piece of equipment related to the image processing to make a transition to an initial state without performing the system initialization processing; and controlling the image processing section so that, if the transition to an initial state fails to occur, the image processing section restarts and performs the system initialization processing.

14. A method according to claim 13, further comprising:

utilizing one section of the image processing apparatus to make a trial of eliminating the abnormal state, and utilizing another section of the image processing apparatus to control the image processing section to restart and perform the system initialization processing if the transition fails.

15. A method according to claim 13, wherein the system initialization processing performed by the image processing section includes either: (1) turning on again a power source of the piece of equipment related to the image processing and initializing the equipment related to the image processing, or (2) downloading a parameter or program to the piece of equipment related to the image processing.

16. A method according to claim 13, further comprising:

detecting the abnormal state of the image processing section based on an emergency stop process initiated by an operator of the imager processing apparatus.

17. A method according to claim 13, wherein the image processing section performs a single main process and manages plural sub-processes, and the method further comprises:

making a trial of eliminating the abnormal state by giving, to the plural sub-processes of the image processing section, an instruction for transition to an initial state.

18. A method according to claim 17, further comprising:

determining whether the transition to an initial state succeeds or fails based on whether a normal response to the instruction for transition to an initial state is received from the sub-processes within a predetermined time.

19. A method according to claim 13, further comprising:

making a trial of eliminating the abnormal state by giving, to the piece of equipment related to the image processing, an instruction for transition to an initial state.

20. A method according to claim 19, further comprising:

determining whether the transition to an initial state succeeds or fails based on a whether a normal response to the instruction for transition to an initial state is received from the piece of equipment related to the image processing within a predetermined time.

* * * * *